United States Patent
Takahashi et al.

[11] Patent Number: 5,979,614
[45] Date of Patent: Nov. 9, 1999

[54] BRAKE DISC PRODUCED FROM MARTENSITIC STAINLESS STEEL AND PROCESS FOR PRODUCING SAME

[75] Inventors: Akihiko Takahashi; Kiyoshi Yamaji, both of Kitakyushu; Toshio Tanoue, Tokyo, all of Japan

[73] Assignee: Nippon Steel Corporation, Tokyo, Japan

[21] Appl. No.: 08/938,002

[22] Filed: Sep. 24, 1997

[30] Foreign Application Priority Data

Sep. 25, 1996 [JP] Japan ................................ 8-252929

[51] Int. Cl.⁶ ........................... F16D 65/12; C22C 38/40
[52] U.S. Cl. ................................ 188/218 XL; 148/325
[58] Field of Search .................... 188/218, 251 M; 420/34, 60; 148/534, 609, 325

[56] References Cited

U.S. PATENT DOCUMENTS

| | | | |
|---|---|---|---|
| 4,126,492 | 11/1978 | Okunishi et al. | 148/325 |
| 4,166,521 | 9/1979 | Okunishi et al. | 188/251 M |
| 4,256,486 | 3/1981 | Yoshioka et al. | 148/534 |
| 4,452,649 | 6/1984 | Yoshioka et al. | 148/325 |
| 4,756,792 | 7/1988 | McMurray | 188/218 X |
| 5,217,546 | 6/1993 | Eady et al. | 148/549 |
| 5,261,511 | 11/1993 | Libsch et al. | 188/218 X |

FOREIGN PATENT DOCUMENTS

| | | |
|---|---|---|
| 55-21566 | 2/1980 | Japan . |
| 57-198249 | 12/1982 | Japan . |
| 61-174361 | 8/1986 | Japan . |

*Primary Examiner*—Chris Schwartz
*Attorney, Agent, or Firm*—Kenyon & Kenyon

[57] ABSTRACT

A brake disc capable of being used in an as quenched state, excellent in rusting resistance, toughness and resistance to softening resulting from heat generation caused by braking, and preferably useful as a brake disc for a two-wheeled vehicle, which is produced from a martensitic stainless steel comprising 0.02 to 0.10% of C, up to 0.03% of N, up to 0.05% of Si, 0.5 to 1.5% of Mn, up to 0.5% of Ni, 10 to 15% of Cr, 0.5 to 2.5% of Cu, up to 0.1% of Al and the balance substantially Fe and unavoidable impurities provided that the amount of C+N is from 0.05 to 0.1% and γp is at least 90, and a process for producing the same.

4 Claims, 1 Drawing Sheet

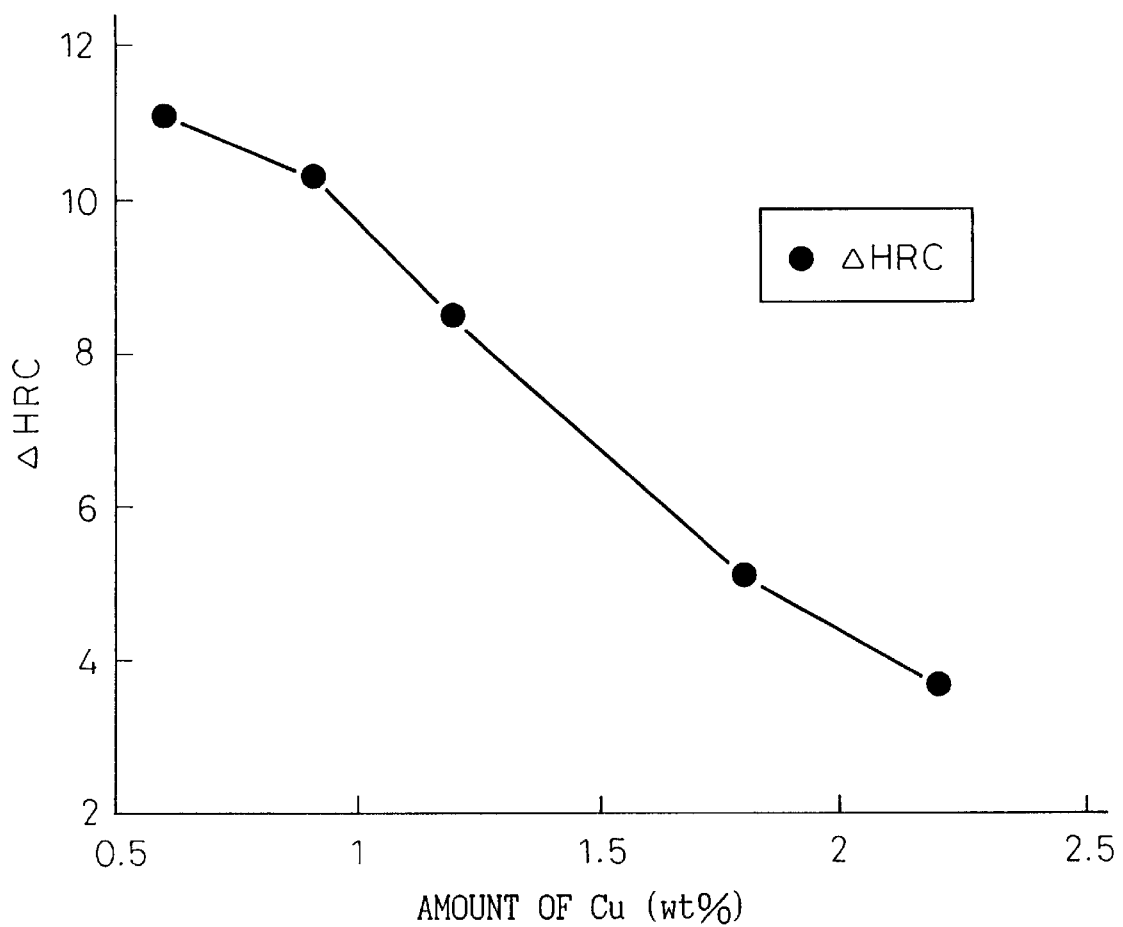

BRAKE DISC PRODUCED FROM MARTENSITIC STAINLESS STEEL AND PROCESS FOR PRODUCING SAME

BACKGROUND OF THE INVENTION

1. Field of the Invention

The present invention relates to a brake disc used for a general vehicle, particularly to a brake disc for a two-wheeled vehicle. The present invention relates to a brake disc stably having a necessary hardness as a brake in an as quenched state after working, excellent in rusting resistance and softening resistance during use, and produced from a martensitic stainless steel.

2. Description of the Prior Art

A brake disc of a two-wheeled vehicle is required to have properties such as abrasion resistance, rusting resistance and toughness. Although the abrasion resistance of the brake disc is generally improved as the hardness is increased, a so-called brake noise is produced between the brake and the pad when the hardness is too high. The hardness of the brake is, therefore, required to be 35±3 HRC (Rockwell hardness C scale). To obtain the desired hardness and rusting resistance, a martensitic stainless steel is used as a brake disc material.

In prior art for the brake disc material, SUS 420 J1 (13Cr-0.2C) type martensitic stainless steel has been quenched and tempered to have the desired hardness, and used as a brake disc. However, the prior art requires two heat treatment steps of quenching and tempering, and, therefore, has problems of productivity and price. In addition, the prior art has the limited heat treatment condition because it is difficult to obtain a necessary hardness after tempering in the quenching temperature ranges. Accordingly, demand for a martensitic stainless steel which can be used for a brake in an as quenched state has been growing to save production steps and energy.

In order to meet the requirements as mentioned above, Kokai (Japanese Unexamined Patent Publication) Nos. 55-21566 and 57-198249 disclose steel compositions in which the amounts of C and N are reduced and Mn, an austenite-forming element, for compensating a narrowed hardenable temperature region due to the shrinkage of an austenite temperature region caused by reducing the amounts of C and N is added, and Which consequently stably shows the desired hardness in an as quenched state brought about by hardening from a wide temperature range compared with conventional steels. However, since the steels contain Mn in respective amounts of 1.0 to 3.5% by weight and 1.0 to 2.5% by weight, they each contain a large amount of MnS which impairs the rusting resistance. Accordingly, it must be concluded that the quenching stability is given to the steels in preference to and at the cost of the rusting resistance. To improve the drawback as mentioned above, Kokai (Japanese Unexamined Patent Publication) No. 61-174361 discloses a steel composition which is prepared by adding Mn in a decreased amount while Cu and N as elements not impairing the rusting resistance are added instead in respective amounts of 0.5 to 1.2% by weight and 0.03 to 0.07% by weight to ensure the quenching stability. Although the steel keeps the quenching stability and rusting resistance as desired, it has a N content as high as at least 0.03% by weight. Consequently, there is a fear that when the steel is tempered by heat generation caused by braking during use of the brake disc, fine nitrides may precipitate to lower the toughness and that the brake disc may not perform its function. Moreover, it is said that the brake disc is sometimes heated to 500 to 600° C. as a result of heat generation caused by braking. The steels which have heretofore been proposed as mentioned above have, therefore, a problem that softening by tempering is unavoidable when the steels reach temperatures in the range mentioned above.

SUMMARY OF THE INVENTION

An object of the present invention is to advantageously solve the problems associated with the prior art as described above, and provide a brake disc for a two-wheeled vehicle excellent in quenching stability, rusting resistance and toughness, further excellent in resistance to softening resulting from heat generation caused by braking, capable of being used in an as-quenched state, and produced from a martensitic stainless steel having an appropriate chemical composition.

The martensitic stainless steel used as a material for a brake disc of the present invention is produced by restricting the addition amounts of C and N to specific ranges, limiting the contents of austenite-forming elements and ferrite-forming elements to specific ranges, and further adding Cu in an appropriate amount. Consequently, the martensitic stainless steel has the desired hardness, excellent quenching stability, excellent rusting resistance, good toughness and excellent resistance to softening resulting from heat generation caused by braking.

That is, the brake disc, particularly preferably the brake disc for the two-wheeled vehicle of the present invention, produced from a martensitic stainless steel which is, as a material composition, a martensitic stainless steel comprising 0.02 to 0.10% of C, up to 0.03% of N, up to 0.5% of Si, 0.5 to 1.5% of Mn, up to 0.5% of Ni, 10 to 15% of Cr, 0.5 to 2.5% of Cu, up to 0.1% of Al and the balance substantially Fe and unavoidable impurities provided that the amount of C+N is 0.05 to 0.1% and γp represented by the formula $$\gamma p = 420[\% C] + 470[\% N] + 23[\% Ni] + 9[\% Cu] + 7[\% Mn] - 11.5[\% Cr] - 11.5[\% Si] - 52[\% Al] + 189$$

is at least 90.

Moreover, the brake disc prepared from the martensitic stainless steel according to the present invention has a hardness of 35±3 HRC (Rockwell hardness C scale), as quenched state.

Furthermore, the present invention provides a process for producing a brake disc having a brake disc hardness of 35±3 HRC (Rockwell hardness C scale), which process comprises hardening the martensitic stainless steel having a chemical composition as mentioned above from temperatures of 950 to 1,150° C. The present invention is characterized by that the γp value mentioned above is defined in a specified range. The γp is a parameter for estimating an approximate amount of austenite formed during heating at 1,100° C., and is represented by a linear combination of major austenite-forming elements each having a positive coefficient and major ferrite-forming elements each having a negative coefficient. Although the austenite amount during heating for hardening depends on the chemical composition and the heating conditions, the stainless steels according to the present invention have an approximate austenite area ratio of at least 90% and a γp value of at least 90. Accordingly, the structure subsequent to quenching becomes a hardened one substantially composed of martensite.

BRIEF DESCRIPTION OF THE DRAWING

FIG. 1 is a graph showing the relationship between an addition amount of Cu and a resistance to softening resulting from tempering and heat generation caused by braking of a martensitic stainless steel of the present invention at the time of subjecting the stainless steel to hot rolling-quenching-tempering treatment, which simulated as the quenched state.

DESCRIPTION OF THE PREFERRED EMBODIMENTS

The present inventors prepared brake discs from a conventional low C martensitic stainless steel containing 0.05% of N and 0.6% of Cu, conducted braking tests 10,000 times, and investigated the toughness change. The toughness was evaluated by impact tests using JIS No. 4 subsize test pieces (thickness: 5.0 mm). As a result of testing at 25° C., the test pieces showed a decrease in the absorption energy of 10 joules after the braking tests, compared with those which were as quenched. Samples for observation were prepared from the brakes, and observed by an electron microscope. As a result, the stainless steel samples were proved to form fine $Cr_2N$ after braking.

Accordingly, martensitic stainless steel materials were prepared by melting in a laboratory while the amount of Cu was fixed to 1% and the amount of N alone was varied, and the influence of the addition amount of N on the precipitation of $Cr_2N$ subsequent to braking tests was examined. As a result, it was confirmed that the precipitation amount of $Cr_2N$ considerably increased when the addition amount of N exceeded 0.03% and that the addition of N in the increased amount became a major cause of the toughness decrease. However, merely decreasing the addition amount of N reduces the austenite-forming temperature range and the hardenable temperature ranges. Since N is an element highly capable of forming austenite, decreasing the amount of N results in narrowing the austenite region in the equilibrium diagram. On the other hand, in order to form a martensite structure by quenching, the stainless steel must be heated to the austenite region. When the austenite region is narrowed, hardenable conditions such as a hardening temperature range are narrowed in accordance with the narrowed austenite region. Accordingly, the present inventors tried to clarify the range of chemical composition where a satisfactory hardenable temperature range could be obtained even when the amount of N was decreased. Concretely, stainless steels having various chemical compositions were melted in a laboratory, and examined to define the optimum chemical composition range of the stainless steels which were hardenable from temperatures of 900 to 1,150° C. and which stably satisfied the hardness of 35±3 HRC.

As a result, the present inventors have discovered that when C+N=0.05 to 0.1% and γp of the following formula is at least 90, the desired object is achieved:

γp=420[% C]+470[% N]+23[% Ni]+9[% Cu]+7[% Mn]−11.5[% Cr]−11.5[% Si]−52[% Al]+189

Furthermore, the present inventors thought that the effect of so-called aging precipitation of Cu would inhibit softening resulting from heat generation caused by braking, and investigated the influence of the addition amount of Cu on the resistance to temper softening which is carried out by a simulation for the heat generation caused by braking. A martensitic stainless steel containing 0.05% of C, 0.015% of N, 0.25% of Si, 0.9% of Mn, 0.15% of Ni and 12.5% of Cr was used as a base material. Sample stainless steels prepared by changing the addition amount of Cu were hot rolled, hardened from 950° C., and tempered by heating the stainless steels at 600° C. for 10 minutes and air cooling. The influence of the addition amount of Cu on a decrease in hardness caused by tempering was investigated thereon. As a result, the present inventors also have discovered that as shown in FIG. 1, the stainless steels obtained by the addition of at least 0.5% of Cu, preferably at least 1.0% of Cu show a difference of the Rockwell C scale hardness of less than 10 even when they- are heated to 600° C. by braking, that is, they have excellent softening resistance.

Next, the constituent elements of the martensitic stainless steel used as a material for the brake disc of the present invention and reasons for the restriction of them will be explained.

C and N are elements effective in enhancing the hardness and obtaining abrasion resistance. When N is excessively added, fine $Cr_2N$ precipitates in the stainless steel as a result of tempering caused by heat generation of braking, and the precipitates cause a decrease in the toughness. Accordingly, the upper limit of the amount is defined to be 0.03%. Moreover, to obtain the desired hardness as a brake disc, namely 35±3 HRC, the amount of C+N is defined to be from 0.05 to 0.1%.

Si is an element remaining in the stainless steel after being used as an deoxidizing element. When Si is excessively added, nonmetallic inclusions remain therein, and exert adverse effects such as a decrease in the toughness. Accordingly, the upper limit of the addition amount is defined to be up to 0.5%.

Since Mn deoxidizes and expands the hardenable temperature range, it must be added in an amount of at least 0.5%. The upper limit of the addition amount of Mn may be determined in accordance with necessary rusting resistance. However, when Mn is added in a large amount, a large amount of MnS remains in the stainless steel. The remaining MnS becomes starting points of rusting and deteriorates the rusting resistance. Accordingly, the upper limit of the addition amount of Mn is defined to be 1.5%. In addition, when the stainless steel is required to have better rusting resistance, it is preferred that the upper limit be defined to be 1.2%.

Although Ni has the effect of expanding the hardenable temperature range in the same manner as Mn, the addition amount is so small that it equals the Ni incorporated into the stainless steel from scrap, in the present invention, because Ni is costly. The upper limit of the amount of Ni is thus defined to be 0.5%.

Cr is necessary in a minimum amount of at least 10% for ensuring the corrosion resistance. However, Cr in an amount exceeding 15% forms a structure mainly containing ferrite, and the desired hardness cannot be obtained. Accordingly, the upper limit of Cr is defined to be 15%.

At least 0.5% of Cu must be added to expand the hardenable temperature range. Moreover, Cu is also an element effective in inhibiting the softening resulting from heat generation caused by braking. When the stainless steel is to be heated to temperatures exceeding 500° C. as a result of the heat generation caused by braking, Cu is desirably added in an amount of at least 1.0%. However, excessive addition of Cu lowers the hot workability, and precipitation of Cu lowers the toughness. Accordingly, the upper limit of the addition amount is defined to be 2.5%.

Al is an element remaining in the stainless steel after being used as a deoxidizing element. When Al is excessively added, nonmetallic inclusions remain therein, and exert adverse effects such as a decrease in the ductility or toughness. Accordingly, the upper limit of the addition amount is defined to be up to 0.1%.

Furthermore, in order to make the stainless steel in the present invention stably hardenable from temperatures of 900 to 1,150° C., the addition constituents are adjusted so that the γp represented by the above formula becomes at least 90, that is, a chemical composition resulting from the optimum combination of the austenite-forming elements and the ferrite-forming elements is obtained.

EXAMPLE

Example 1

A steel having a chemical composition as shown in Table 1 was melted in the laboratory, and an ingot was prepared. The ingot was hot rolled in the laboratory, annealed, and cut out to give samples for heat treatment. The samples were heat treated, that is, the samples were heated at 950° C. for 10 minutes, and quenched by water cooling. A tempered state caused by braking was simulated by tempering the quenched sample at 600° C. for 10 minutes.

Measurements of Rockwell C scale hardness were made on the as quenched sample and the sample subsequent to tempering. Test pieces having a half subsize of a JIS No. 4 test piece and prepared from the samples were subjected to impact tests. The results are also shown in Table 1. The as quenched hardness of the samples must satisfy 35±3 HRC, a value generally required for a brake disc. As to the impact characteristic, the as quenched sample and the sample subsequent to quenching were judged to be excellent in toughness when they showed an absorption energy of at least 30 joules at 25° C. The samples were judged to be excellent in the :resistance to softening resulting from tempering when the samples had a hardness difference of less than 10 HRC between the as quenched hardness and the hardness subsequent to tempering.

It is seen from Table 1 that a sample satisfying the conditions of the present invention satisfied the condition of 35±3 HRC in an as quenched state to have a desired hardness, and that both the as quenched samples and the samples subsequent to tempering showed excellent impact characteristics. Furthermore, it is also seen that samples to which Cu had been added in an amount exceeding 1.0% had excellent softening resistance even when heated to a temperature as high as 600° C. by braking.

On the other hand, since the amount of C+N of the stainless steel in Comparative Example 1 was too low, the as quenched hardness did not satisfy the requirement. Since the amount thereof exceeded 0.1% in Comparative Example 2, the stainless steel showed an excessively high as quenched hardness. Moreover, since the stainless steel in Comparative Example 3 had γp less than 90, it had a low as quenched hardness, and showed a low impact-resistant value due to the presence of coarse ferrite grains. Since the amount of N of the stainless steel in Comparative Example 4 exceeded 0.03%, fine $Cr_2N$ precipitated in the stainless steel, and the stainless steel showed considerable deterioration of toughness caused by tempering.

As explained above, the present invention can provide a brake disc for a two-wheeled vehicle produced from a martensitic stainless steel, excellent in quenching stability, rusting resistance and toughness, and further excellent in resistance to softening resulting from heat generation caused by braking, and capable of being used in an as quenched state.

We claim:

1. A brake disc capable of being used in an as quenched state, which is produced from a martensitic stainless steel comprising 0.02 to 0.10% of C, up to 0.027% of N, up to 0.5% of Si, 0.5 to 1.5% of Mn, up to 0.5% of Ni, 10 to 15% of Cr, 1.0 to 2.5% of Cu, up to 0.1% of Al and the balance substantially Fe and unavoidable impurities provided that the amount of C+N is 0.05 to 0.1% and γp represented by the formula $$\gamma p = 420(\% C) + 470(\% N) + 23(\% Ni) + 9(\% Cu) + 7(\% Mn) - 11.5(\% Cr) - 11.5(\% Si) - 52(\% Al) + 189 \text{ is at least } 90.$$

2. The brake disc capable of being used in an as quenched state according to claim 1, wherein the brake disc has a brake disc hardness in a range of 32–38 HRC (Rockwell hardness C scale).

TABLE 1

|  | C | N | Si | Mn | Al | Ni | Cr | Cu | C + N | γp | HRC | Charpy absorption energy/J | | Softening by tempering ΔHRC |
|---|---|---|---|---|---|---|---|---|---|---|---|---|---|---|
|  |  |  |  |  |  |  |  |  |  |  |  | As quenched | After tempering |  |
| Invention 1 | 0.050 | 0.024 | 0.20 | 0.90 | 0.010 | 0.07 | 12.3 | 0.7 | 0.074 | 91.2 | 35.5 | 38 | 39 | 11.1 |
| Invention 2 | 0.030 | 0.025 | 0.15 | 0.90 | 0.010 | 0.20 | 12.1 | 1.2 | 0.055 | 93.7 | 32.5 | 50 | 52 | 8.7 |
| Invention 3 | 0.060 | 0.027 | 0.25 | 0.80 | 0.015 | 0.08 | 12.2 | 0.6 | 0.087 | 95.8 | 37.8 | 34 | 37 | 10.7 |
| Invention 4 | 0.050 | 0.024 | 0.15 | 0.90 | 0.010 | 0.07 | 12.5 | 1.2 | 0.074 | 94.0 | 35.6 | 40 | 40 | 8.5 |
| Invention 5 | 0.050 | 0.015 | 0.21 | 0.60 | 0.012 | 0.15 | 12.1 | 1.8 | 0.065 | 98.7 | 34.2 | 45 | 46 | 5.1 |
| Invention 6 | 0.040 | 0.020 | 0.25 | 0.70 | 0.015 | 0.10 | 12.7 | 2.2 | 0.060 | 92.5 | 34.0 | 46 | 48 | 3.7 |
| Invention 7 | 0.055 | 0.018 | 0.30 | 1.20 | 0.001 | 0.07 | 12.1 | 0.7 | 0.073 | 94.2 | 35.3 | 41 | 42 | 11.0 |
| Invention 8 | 0.053 | 0.019 | 0.28 | 1.39 | 0.001 | 0.07 | 12.2 | 0.6 | 0.072 | 93.2 | 35.1 | 40 | 41 | 11.0 |
| Comp. Ex. 1 | 0.020 | 0.025 | 0.21 | 1.10 | 0.010 | 0.20 | 11.9 | 1.2 | 0.045 | 92.5 | 30.5 | 52 | 53 | 8.8 |
| Comp. Ex. 2 | 0.090 | 0.025 | 0.25 | 0.90 | 0.010 | 0.07 | 12.2 | 0.6 | 0.115 | 108.2 | 41.0 | 28 | 30 | 12.0 |
| Comp. Ex. 3 | 0.050 | 0.025 | 0.22 | 0.80 | 0.015 | 0.07 | 12.5 | 0.6 | 0.075 | 87.3 | 31.5 | 22 | 25 | 10.5 |
| Comp. Ex. 4 | 0.030 | 0.050 | 0.21 | 0.90 | 0.010 | 0.07 | 12.2 | 0.6 | 0.080 | 95.2 | 36.1 | 32 | 10 | 11.8 |

3. The brake disc according to claim 1, wherein the brake disc is used for a two-wheeled vehicle.

4. A process for producing a brake disc having a brake disc hardness in a range of 32–38 HRC (Rockwell hardness C scale), capable of being used in an as quenched state, which comprises hardening from temperatures of 950 to 1,150° C. a martensitic stainless steel comprising 0.02 to 0.10% of C, up to 0.27% of N, up to 0.5% of Si, 0.5 to 1.5% of Mn, up to 0.5% of Ni, 10 to 15% of Cr, 1.0 to 2.5% of Cu, up to 0.1% of Al and the balance substantially Fe and unavoidable impurities provided that the amount of C+N is from 0.05 to 0.1% and γp represented by the formula $$\gamma p = 420(\% C) + 470(\% N) + 23(\% Ni) + 9(\% Cu) + 7(\% Mn) - 11.5(\% Cr) - 11.5(\% Si) - 52(\% Al) + 189$$ is at least 90.

* * * * *

UNITED STATES PATENT AND TRADEMARK OFFICE
CERTIFICATE OF CORRECTION

PATENT NO. : 5,979,614
DATED : November 9, 1999
INVENTOR(S) : Akihiko Takahashi, et. al.

It is certified that error appears in the above-identified patent and that said Letters Patent is hereby corrected as shown below:

Column 1, line 45, change "Which" to --which--.

Column 6, line 44, change "The brake" to --A brake--.

Signed and Sealed this

Sixth Day of February, 2001

Attest:

Attesting Officer

Q. TODD DICKINSON
Director of Patents and Trademarks